Feb. 23, 1954 W. KNAUF 2,670,096
LOCKING DEVICE FOR PHOTOGRAPHIC CAMERA BACKS
Filed Nov. 14, 1950
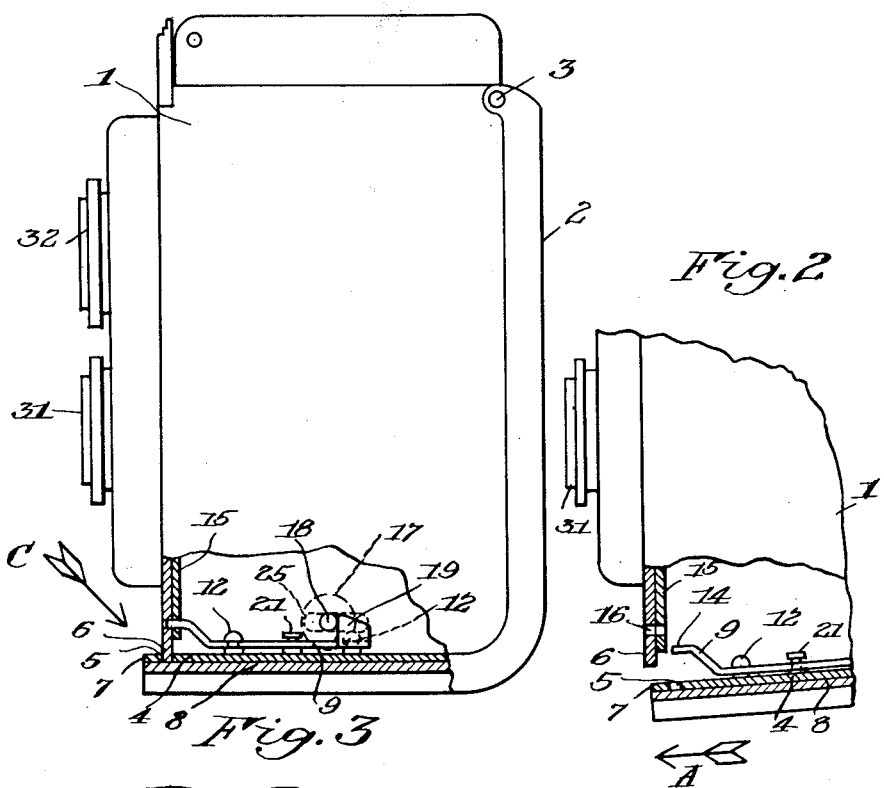
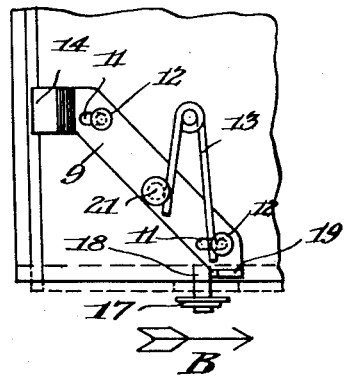
INVENTOR.
Wilhelm Knauf
BY Charles Shepard
Attorney Patented Feb. 23, 1954

2,670,096

UNITED STATES PATENT OFFICE 2,670,096

LOCKING DEVICE FOR PHOTOGRAPHIC CAMERA BACKS

Wilhelm Knauf, Braunschweig, Germany, assignor to Franke & Heidecke, Fabrik Photographischer Prazisions - Apparate, Braunschweig, Germany, a firm Application November 14, 1950, Serial No. 195,544

3 Claims. (Cl. 220—32)

The present invention relates to photographic cameras, and more particularly to the manner in which the back cover or closure of the camera (hereinafter referred to as merely the back) is held in closed position on the camera body.

An object of the present invention is the provision of latching or locking means for the camera back, which is of simple and effective construction, and more satisfactory and efficient in use than the constructions available in the prior art.

Another object of the invention is the provision of camera back latching means which utilizes the inherent resilience or springiness of the camera back itself, to effect the initial latching action, in combination with a locking member or safety catch for holding the camera back in its latched or closed position, which locking member may be unlocked at appropriate times to permit the opening of the camera back for any necessary purpose, such as removing the exposed film and substituting fresh film.

These and other desirable objects are accomplished by the construction disclosed as an illustrative embodiment of the invention in the following description and in the accompanying drawings forming a part hereof, in which:

Fig. 1 is a side view of a photographic camera in accordance with the present invention, with part of the side wall broken away to show interior parts, the back being in its fully latched and locked position;

Fig. 2 is a view similar to the lower part of Fig. 1, with the camera back in a slightly open position; and Fig. 3 is a fragmentary diagrammatic plan of the lower part of the camera back, showing particularly the locking mechanism.

The same reference numerals throughout the several views indicate the same parts.

Referring now to the drawings, the camera comprises a main body 1 of any conventional construction, open at its back wall and its bottom wall as is well known in certain types of small cameras, and provided with a back indicated in general at 2, hinged to the body 1 at 3, near the upper rear edge of the camera, and extending down the back wall, thence turning forwardly and extending across the bottom of the camera, all as well known with said types of small cameras, so that when the back is opened, the camera body itself is open both at the rear and at the bottom.

Camera backs of this kind have a certain amount of resiliency or springiness or flexibility which is inherent in any practical construction, even when not intentionally desired, and this resilience or springiness exists to an appreciable degree, when using construction materials of the thicknesses and dimensions customarily used in such camera backs, whether the backs be made of metal, wood, plastic material, or other suitable materials. For purposes of the present invention, advantage is taken of this springiness or resiliency or flexibility in order to achieve the latching of the back to the camera body for retaining the back in closed position. To this end, the camera back, or at least the portion thereof at the bottom of the camera, is conveniently of laminated construction having, for example, the layers 4 and 8, the former of which is provided with a slot or groove 5 in position to receive the rim or bottom edge 6 of the front wall of the camera body. Forwardly of the groove, the bottom wall of the back projects as a smooth riding surface terminating at the groove. In closing the back, when pressure is applied to the back in the direction of the arrow A in Fig. 2, the back is forced against the rim 6 until such rim rides rearwardly on the said projecting riding surface and snaps into the groove or slot 5, the parts then being in the fully closed position shown in Fig. 1. This seals the back against the camera body in the necessary light-tight manner. In other words, the initial part of the closing movement of the back causes the bottom edge of the rim 6 to ride on the portion 7 of the camera back until, as a result of further pressure applied to the back, the back is stressed or sprung sufficiently to cause the rim 6 to enter the slot 5.

When it is desired to open the back to obtain access to the interior of the camera body, for changing the film or for other reasons, pressure is applied to the forward edge of the back in the direction of the arrow C in Fig. 1, thus stressing or springing the forward edge of the back downwardly sufficiently far to release the groove or slot 5 from the lower edge of the rim 6, whereupon the back may be fully opened.

This cooperation of the rim 6 with the groove 5 constitutes, in effect, a resilient latch for latching the camera back in closed position relative to the camera body. But to avoid accidental release of this latch during handling of the camera, it is desirable to provide also a holding means which may be conveniently referred to as a lock or a safety catch, which must be released before the resilient latch may be released.

This lock or safety catch is conveniently in the form of a bar 9 mounted on the interior of the bottom wall of the back and provided with two parallel slots 11 extending in a direction toward and away from the front wall of the camera, for receiving stationary studs 12 fixed to the back, on which the movements of the locking member or catch 9 are guided. A spring 13, reacting rearwardly against one of the studs 12 and pushing forwardly on a stud 21 secured to the member 9, constantly tends to move this member 9 forwardly so that the upwardly bent or offset front end 14 of the locking member 9 strikes against the inner surface 15 of the front wall of the camera during the closing movement of the back. As the closing of the back continues, the pressure of the front wall forces the member 9 rearwardly against the action of the spring 13, until the back reaches its fully closed position, whereupon the front end 14 comes opposite a slot 16 in the front wall of the camera and is moved forwardly into this slot by means of the spring 13. As long as the parts 9, 14, engage in the slot 16, downward pressure on the front edge of the camera back is ineffective to disengage the back from the front wall of the camera, so the back remains latched in its closed position until the lock or safety catch 9, 14 is released.

Various mechanisms may be used for releasing the safety catch when the back is to be opened. One end of the safety catch may be provided with an upstanding nose or ear 19 preferably operable by some other part of the camera mechanism, such as a suitable part connected to the film rewind whereby the member 19 is pulled rearwardly to release the safety catch when and only when the rewind mechanism has been fully operated to rewind the film into the cassette or other film chamber. Or again, this member 19 may be operated by the film winding or metering mechanism only after all of the exposure areas on the film have been exposed and there are no unexposed portions left. But for the sake of simplicity in the illustration, it is here shown as being operated manually by an externally accessible knob or button 17 which may be pulled rearwardly along the outside of the side wall of the camera body, and having a pin 18 which projects into the camera body through a slot 20 (light guarded in any suitable manner) into position to engage the upstanding part 19 of the locking member 9 and to move the latter rearwardly whenever the external knob 17 is moved rearwardly.

Thus the rearward movement of the button 17 pulls the locking member or safety catch 9 rearwardly, releasing the forward end 14 thereof from the slot 16, and then the front edge of the back may be pressed downwardly in the direction of the arrow C in Fig. 1, to open the back. The exact mechanism by which the locking member 9 is pulled rearwardly to release it, is unimportant for present purposes, as there are many possibilities, some of which have been briefly mentioned above.

Those familiar with small cameras of this general type will recognize the showing at the left side of Fig. 1 as representing diagrammatically a taking lens 31 for admitting light into the exposure chamber of the camera, and a finder lens 32 for admitting light into the finder chamber (usually of the reflex type) which is arranged above the exposure chamber.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. A photographic camera of the twin lens reflex type comprising a body having front and top walls and being open at two adjacent sides at an angle to each other constituting the rear and bottom sides of the body, and a back member having two wall portions at an angle to each other arranged to fit against and form a tight closure with the camera body along its two open sides and to constitute back and bottom walls for the camera body when the back member is in closed position, hinge means connecting the back wall of said back member to said body adjacent the top wall thereof, said front wall of said body including near its bottom edge a downwardly extending rim, said bottom wall of said back member including a groove complementary to said rim for receiving the rim when the back member is closed, said back member being sufficiently resilient so that as the back member is swung on said hinge means from open position to closed position, the back member will spring slightly to enable said rim to snap into said groove, a catch mounted on said back member and engaging said body to prevent movement of said back member relative to said body in an opening direction until said catch is released.

2. A construction as defined in claim 1, in which said catch includes a bar movably mounted on the interior of the back member and spring means tending to move said bar toward a wall of the body, said wall having an opening in position to receive a portion of said bar when said back member is in closed position.

3. A construction as defined in claim 2, including means movably mounted on said body and engageable with said catch when said back member is in closed position, for moving said catch to release it.

WILHELM KNAUF.

References Cited in the file of this patent

UNITED STATES PATENTS

| Number | Name | Date |
|---|---|---|
| 1,154,046 | Nasief | Sept. 21, 1915 |
| 1,666,653 | Hiering | Apr. 17, 1928 |
| 2,297,984 | Reller | Oct. 6, 1942 |
| 2,439,112 | Teague | Apr. 6, 1948 |

FOREIGN PATENTS

| Number | Country | Date |
|---|---|---|
| 672,699 | France | Sept. 23, 1929 |
| 448,017 | Great Britain | 1936 |